(12) United States Patent
Kundalgurki (10) Patent No.: US 10,513,449 B2
(45) Date of Patent: Dec. 24, 2019

(54) WATER TREATMENT SYSTEM

(71) Applicant: Prerna Kundalgurki, Austin, TX (US)

(72) Inventor: Prerna Kundalgurki, Austin, TX (US)

( * ) Notice: Subject to any disclaimer, the term of this patent is extended or adjusted under 35 U.S.C. 154(b) by 352 days.

(21) Appl. No.: 15/679,718

(22) Filed: Aug. 17, 2017

(65) Prior Publication Data

US 2018/0050935 A1    Feb. 22, 2018

Related U.S. Application Data (60) Provisional application No. 62/377,660, filed on Aug. 21, 2016, provisional application No. 62/399,372, filed on Sep. 24, 2016, provisional application No. 62/530,416, filed on Jul. 10, 2017.

(51) Int. Cl.
| | |
|---|---|
| *C02F 1/469* | (2006.01) |
| *B01D 61/42* | (2006.01) |
| *B01D 71/56* | (2006.01) |
| *B01D 63/06* | (2006.01) |
| *C02F 1/461* | (2006.01) |

(52) U.S. Cl.
CPC .......... *C02F 1/4693* (2013.01); *B01D 61/427* (2013.01); *B01D 63/06* (2013.01); *B01D 71/56* (2013.01); *C02F 1/469* (2013.01); *C02F 1/4698* (2013.01); *C02F 2001/46133* (2013.01); *C02F 2001/46157* (2013.01); *Y02A 20/131* (2018.01)

(58) Field of Classification Search
CPC .... C02F 1/4696; C02F 1/4604; B01D 61/427; B01D 61/425
See application file for complete search history.

(56) References Cited

U.S. PATENT DOCUMENTS

| | | | |
|---|---|---|---|
| 4,310,396 A | 1/1982 | Demaire et al. | |
| 5,043,048 A * | 8/1991 | Muralidhara | B01D 35/06 204/518 |
| 5,376,253 A | 12/1994 | Rychen et al. | |
| 5,614,077 A * | 3/1997 | Wittle | B01D 57/02 205/704 |
| 7,927,478 B2 | 4/2011 | Menzel et al. | |
| 8,663,445 B2 | 3/2014 | Niu et al. | |
| 2007/0163891 A1 | 7/2007 | Menzel et al. | |
| 2011/0073487 A1 | 3/2011 | Niu et al. | |
| 2012/0080380 A1* | 4/2012 | Wang | B01D 67/0079 210/654 |
| 2015/0274555 A1 | 10/2015 | Volkel et al. | |

(Continued)

*Primary Examiner* — Steven A. Friday (57) ABSTRACT

A desalination apparatus includes a membrane assembly disposed between a first fluid container and a second fluid container and in fluid contact with a first aqueous solution in the first fluid container and a second aqueous solution in the second fluid container. The membrane assembly includes a semipermeable membrane having a first side to be in fluid contact with the first aqueous solution and having a second side to be in fluid contact with the second aqueous solution; an electrode assembly disposed adjacent the second side of the semipermeable membrane and to contact the second aqueous solution; and power circuitry to apply charge to the electrode assembly to provide an ion concentration at the second side of the semipermeable membrane that is at least equal to the ion concentration on the first side of the semipermeable membrane.

19 Claims, 8 Drawing Sheets

(56) References Cited

U.S. PATENT DOCUMENTS

2015/0283512 A1* 10/2015 Song .................. B01D 61/425
                                                        210/490
2016/0010222 A1   1/2016 Jha et al.
2016/0365596 A1  12/2016 Volkel et al.

* cited by examiner

WATER TREATMENT SYSTEM

CROSS-REFERENCE TO RELATED APPLICATION(S)

This application claims benefit of U.S. Provisional Application No. 62/530,416, filed Jul. 10, 2017, which is incorporated herein by reference in its entirety.

This application claims benefit of U.S. Provisional Application No. 62/399,372, filed Sep. 24, 2016, which is incorporated herein by reference in its entirety.

This application claims benefit of U.S. Provisional Application No. 62/377,660, filed Aug. 21, 2016, which is incorporated herein by reference in its entirety.

FIELD OF THE DISCLOSURE

This disclosure, in general, relates to water treatment systems, and in particular, to water treatment systems that incorporate desalination treatment or decontamination treatment.

BACKGROUND

According to the United Nations, in 2015, 663 million people lacked an improved water supply, and contaminated water resulted in more than ½ million deaths annually. The United Nations expects 14% of the world's population to encounter water scarcity by 2025. Sustaining the availability and quality of water with minimal cost and environmental impact is one of the greatest challenges facing humanity.

However, the largest water resource is saltwater derived from the seas and oceans. Such saltwater is undrinkable in natural form, but can be desalinated and decontaminated to provide potable water. Currently, about 1% of the world's population is dependent on desalinated water. The interest in desalination will likely grow.

Current desalination and decontamination technologies are costly, utilizing considerable energy input. For example, desalination methods using distillation use a considerable amount of energy to facilitate the evaporation of water from a salt water source. Conventional reverse osmosis can also be energy demanding, although less so than distillation, because the saltwater source is pressurized to overcome osmotic pressures across semipermeable membranes. As such, the economics of conventional desalination methods limit their widespread application.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a system for treating water can include a desalination unit. The desalination unit can include a semipermeable membrane and one or more electrodes disposed proximal to major surfaces of the water permeable membrane. When a high bulk concentration solution, such as a salt water solution, is applied to one major surface of the water permeable membrane and a low bulk concentration solution, e.g., a solution having a lower concentration of salt, is applied to an opposite major surface of the water permeable membrane, osmotic pressures tend to drive water flow from the low bulk concentration solution into the high bulk concentration solution. By using the one or more electrodes proximal to the surface of the semipermeable membrane, the difference in local ion concentration around the semipermeable membrane can be reduced or even reversed, easing the flow of water from the high bulk concentration solution to the low bulk concentration solution.

Figure 1:
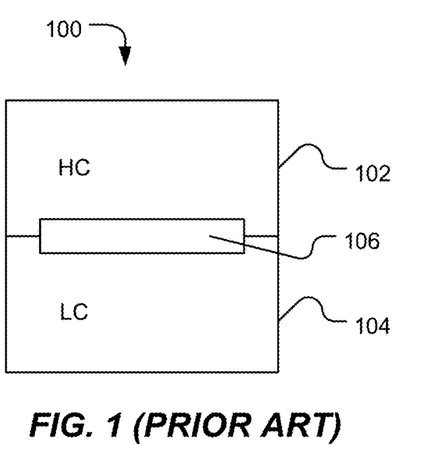
FIG. 1 includes an illustration of a prior art reverse osmosis system.

As illustrated in FIG. 1, a conventional reverse osmosis system 100 includes a chamber or flow cell 102 to receive a high concentration solution and a chamber or flow cell 104 to receive a low concentration solution. The chambers 102 and 104 are separated by a semi permeable membrane 106. Osmotic pressures resulting from the concentration difference across the semipermeable membrane 106 generally drive water from the low concentration solution into the high concentration solution. To overcome such osmotic pressure and to drive water from the high concentration solution to the low concentration solution, conventional reverse osmosis systems apply high pressures to the high concentration solution and optionally draw from the low concentration solution to provide a pressure difference across the membrane 106 that overcomes the osmotic pressure derived from the differences in concentration.

Figure 2:
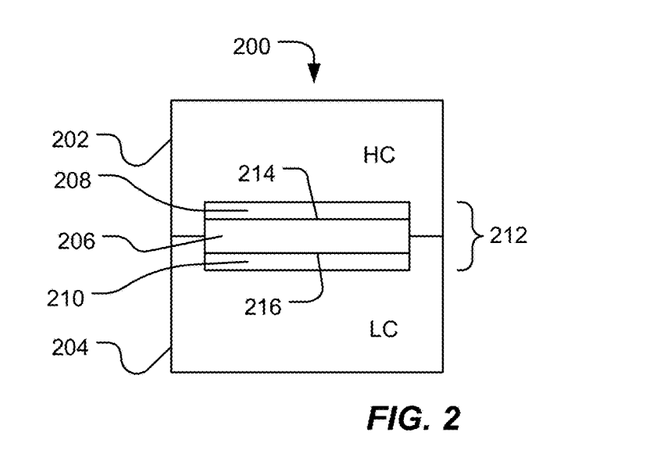
FIG. 2 includes an illustration of a system for desalinating water, embodying aspects of the present disclosure.

In an embodiment of the present system illustrated in FIG. 2, a system 200 includes containers or flow cells 202 and 204 separated by a membrane assembly 212. In an example, the container or flow cell 202 is to receive a high concentration solution, and the container or flow cell 204 is to receive a low concentration solution, the low concentration solution having a lower bulk concentration of salt or ions derived therefrom than the high concentration solution. The membrane assembly 212 can include a semipermeable membrane 206 having major surfaces 214 and 216. For example, the major surface 214 of the membrane 206 is exposed to the chamber or flow cell 202, and the major surface 216 of the semipermeable membrane 206 is exposed to the chamber container or flow cell 204. In addition, the membrane assembly includes one or more electrodes 208 or 210 disposed proximal to the major surfaces 214 or 216 of the semipermeable membrane 206. For example, the electrode 210 can be disposed proximal to the major surface 216 of the semipermeable membrane in contact with or exposed to the low concentration container or flow cell 204. In a further example, the electrode 208 can be in proximity to a major surface 214 of the semipermeable membrane 206 and in contact with or exposed to the high concentration container or flow cell 202.

Figure 3A:
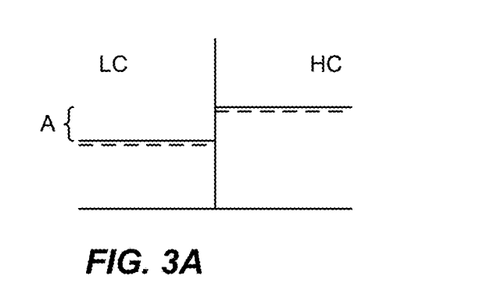
FIG. 3A and FIG. 3B include graphic illustrations exemplifying changes in concentration in response to activating electrodes.
Figure 3B:
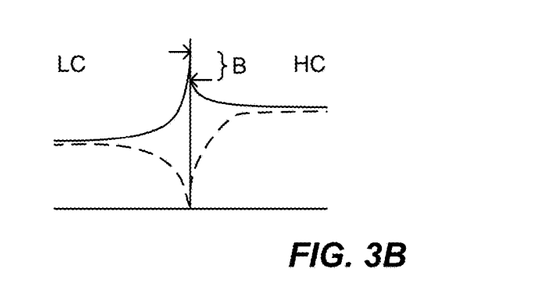

The one or more electrodes can be utilized to manipulate the concentration of ions associated with salt within the solutions in the containers or flow cells 202 or 204, and thus, change the local ion concentrations in the solutions in proximity to the semipermeable membrane 206 from that of the bulk concentration. For example, as illustrated in FIG. 3A and FIG. 3B, when the one or more electrodes are neutral or grounded, the concentrations of ions proximal to the semipermeable membrane on either the high concentration side or low concentration side represents the bulk concentration of the respective solutions. Cation (solid line) and anion (broken line) concentrations in the high concentration solution on the high concentration side of the semipermeable membrane are higher than the cation and anion concentrations on the low concentration side of the semipermeable membrane. The difference (FIG. 3A) in ion concentration, such as the cation concentration, at least in part contributes to osmotic pressure and thus, a tendency for the flow of water from the low concentration side to the high concentration side.

In contrast, when a charge is applied to one or more electrodes on opposite sides of the semipermeable membrane, the local environment around the membrane can be manipulated, for example, to neutralize or even reverse the cation difference (FIG. 3B) at least proximal to the surface of the semipermeable membrane, while the bulk concentration of ions remains approximately constant. In the illustrated example, when a negative charge is applied to the electrodes on opposite sides of the semipermeable membrane, the cation concentration (solid line) proximal to the surface of the semipermeable membrane on both sides increases, while the anion concentrations (broken lines) are driven towards zero. By applying a negative charge of greater magnitude to electrode positioned on the low concentration side of the semipermeable membrane, concentration of cations can be increased relative to the concentration of cations on the high concentration side of the semipermeable membrane either neutralizing or reversing the osmotic pressure tendencies of the system. As such, when charged, a change in ionic composition proximal to the surfaces of the semipermeable membrane can ease or even drive the flow of water from the high concentration side to the low concentration side. Although the example is shown for the application of negative charges to one or more electrodes positioned on opposite sides of the semipermeable membrane, the concentration of ions can be manipulated with a positive charge applied to the one or more electrodes or a charge being applied to an electrode on a single side of the semipermeable membrane.

Returning to FIG. 2, a charge can be applied to the electrode 210 on the low concentration side of the semipermeable membrane 206 to manipulate ion concentration proximal to the surface 216 of the semipermeable membrane 206 to reduce, neutralize or reverse the osmotic pressure tendencies that would be present based on the relative difference of the bulk concentrations on the high concentration side and the low concentration side. Optionally, the charge can be applied to the electrode 208 on the high concentration side to further manipulate ion concentrations proximal to the surface 214 of the semipermeable membrane 206. To facilitate the application of charge to the one or more electrodes 208 or 210, an auxiliary electrode can be inserted into the solutions within the containers 202 or 204 or along the flow path of fluid flowing in and out of the containers or flow cells 202 or 204. While containers 202 and 204 are illustrated as standalone volumes, the volumes may contain static liquid or can be flow through chambers or channels in which solutions are flowing. As used herein, chamber or container may optionally refer to static or flow-through arrangements.

The semipermeable membrane can be a water selective semipermeable membrane. For example, the water selective semipermeable membrane can be formed of a thin film composite. In an example, the membrane or thin film composite includes polyamide, either for the membrane as a whole or a layer of the membrane. In particular, the semipermeable membrane limits ions and other molecules other than water from passing through the membrane, selectively passing water relative to other compounds and ions.

The electrode 208 can be formed of a conductive material. In particular, the conductive material can be in an inert conductive material, providing an inert electrode. Example inert electrode materials include gold, silver, platinum, carbon, mercury, similar materials, or any combination thereof. In another example, the electrode 208 can be formed of a conductive material coated with an inert material. The inert material can be a conductive ceramic or polymer coating, unreactive with components of the solutions. For example, a conductive material can include a metal or semimetal oxide, such as, titanium oxide, Indium oxide, aluminum, cerium, zirconium, or any combination thereof. In another example, a conductive polymer can include polyacetylene, polypyrrole, polyaniline, or a combination thereof.

The electrode 210 can be formed of a conductive material. In particular, the conductive material can be in an inert conductive material, providing an inert electrode. Example inert electrode materials include gold, silver, platinum, carbon, mercury, similar materials, or any combination thereof. In another example, the electrode 210 can be formed of a conductive material coated with an inert or dielectric material. The inert material can be a conductive ceramic or polymer coating, unreactive with components of the solutions. For example, a conductive material can include a metal or semimetal oxide, such as, titanium oxide, indium oxide, aluminum, cerium, zirconium, or any combination thereof. In another example, a conductive polymer can include polyacetylene, polypyrrole, polyaniline, or a combination thereof.

Figure 4A:
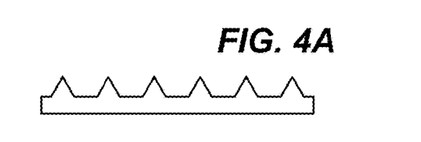
FIG. 4A, FIG. 4B, FIG. 5, and FIG. 6 include illustrations of electrode configurations.
Figure 4B:
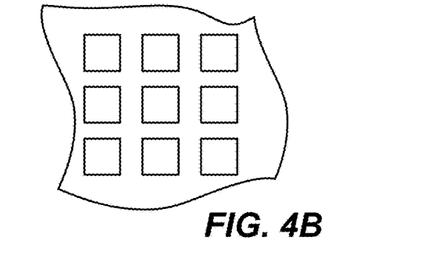
Figure 5:
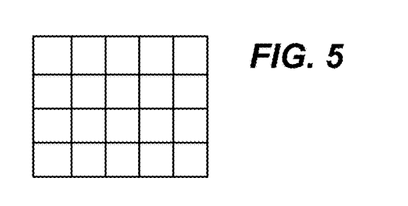
Figure 6:
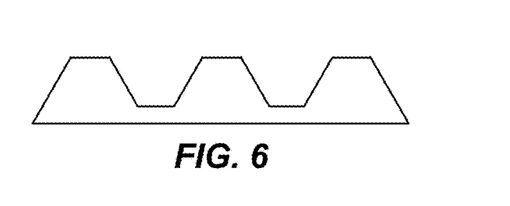

Further, the electrodes can have various configurations. The electrodes can include meshes, structured electrodes, or porous frets. For example, as illustrated in FIG. 4A (side view) and FIG. 4B (plan view), an electrode may be a slotted electrode having a configuration in which openings to the surface of a semipermeable membrane are approximately the same size away from the membrane as close to the membrane. In another example, the electrodes can be configured as a mesh of wires, as illustrated in FIG. 5. In a further example, the electrode can be configured with a fissure design, in which a wider opening faces the bulk solution and the opening narrows as it approaches membrane. Such a fissure design can curtail ionic transport and enhance ionic concentration build up proximal to the surface of the semipermeable membrane. In an example, the electrode 210 on the low concentration side 216 of the semipermeable membrane 206 can have a fissure design. In a further example, the electrode 208 on the high concentration side close to the surface 214 of the semipermeable membrane 206 can have a slotted design or a mesh design.

In a particular example, electrodes on either side of the semipermeable membrane can have the same polarity relative to ground or relative to an auxiliary electrode. In an example, the potential applied to an electrode disposed in or proximal to the low concentration solution can have a potential relative to ground or an auxiliary electrode of 10 mV to 1.23 V, such as in a range of 10 mV to 1000 mV, or a range of 100 mV to 800 mV. The electrode disposed on a high concentration side of the semipermeable membrane can have a potential relative to ground or an auxiliary electrode in a range of 10 mV to 1.23 V, such as in a range of 10 mV to 500 mV, or a range of 10 mV to 100 mV. In particular, when electrodes are present on both sides of the semipermeable membrane, the electrodes can have the same polarity relative to ground or an auxiliary electrode, and the difference in charge between the electrodes can be such that the potential on the lower concentration side electrode relative to the standard hydrogen electrode is more polarized than that on the higher concentration side electrode to always maintain a higher relative local ionic concentration proximal to the lower concentration side electrode surface. For example, the difference in charge between the electrodes can be in a range of 10 mV to 1.23 V, such as in a range of 10 mV to 500 mV, or a range of 10 mV to 100 mV.

The change in ion concentration in the local environment proximal to the semipermeable membrane 206 of FIG. 2 either neutralizes or reverses the osmotic pressure driving force that works against the movement of fluid from the high concentration solution to the low concentration solution. In an example, the high concentration solution and the low concentration solutions can be held at similar pressures and the local difference in ion concentration can be manipulated to facilitate flow of liquid water from the high concentration solution to the low concentration solution. In an alternative example, the manipulation of local ion concentrations can be utilized to further enhance reverse osmosis systems in which the high concentration solution is at a higher pressure than the low concentration solution. In particular, the same rate of water recovery can be accomplished using lower pressure differences between the high concentration solution side and the low concentration solution side.

Figure 7:
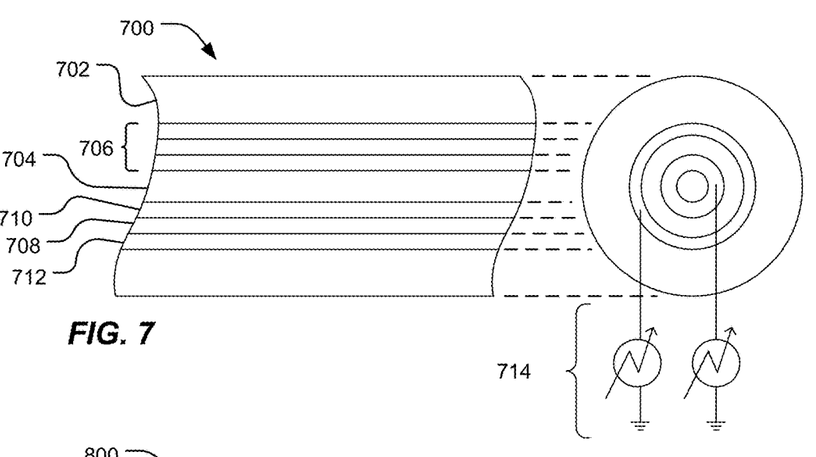
FIG. 7 includes an illustration of a tube-in-tube configuration.

The system can be configured to store the liquid in a static configuration including chambers of various geometries separated by a membrane assembly. In another example, the system can be configured in concentric tubes or can be configured to have multiple tubes running inside a larger tube. Other configurations can be envisaged. For example, as illustrated in FIG. 7, a tube-in-tube configuration 700 includes an outer tube defining a flow channel 702 separated from an inner tube defining a flow channel 704 interior to the inner tube. Portions of the inner tube incorporate a membrane assembly 706 separating the flow channel 702 from the flow channel 704. The membrane assembly 706 can include a semipermeable membrane 708 and an electrode 710 on a low concentration side of the semipermeable membrane 708. For example, high concentration solutions can be provided through the flow channel 702 defined between the outer tube and the inner tube, and lower concentration solutions can be provided through the flow channel 704. Optionally, the membrane assembly 706 can also include an electrode 710 positioned on a high concentration solution side of the semipermeable membrane 708.

In addition to the single tube-in-tube configuration, a multiple tube-in-tube configuration can be envisaged in which multiple tubes run through a larger tube defining space in the larger tube for a high concentration solution. Low concentration solutions can be drawn from the many tubes disposed inside the larger tube, the many tubes incorporating a membrane assembly. Alternatively, the high concentration and low concentrations sides can be switched in the tube-in-tube or multiple tube-in-tube configurations.

The system can also include circuitry 714 to facilitate charge differences on the electrodes 710 or 712. Power circuitry can be configured to provide a potential on the electrodes relative to ground. Alternatively, the power circuitry 714 can provide a relative difference in charge between the two electrodes, between the two electrodes and ground, or between the two electrodes and auxiliary electrodes. In a particular example, the power circuitry 714 provides a similar polarity on the two electrodes relative to ground or auxiliary electrode while keeping the magnitude of charge on the low concentration solution side electrode greater than the magnitude of charge on the high concentration solution electrode.

Figure 8:
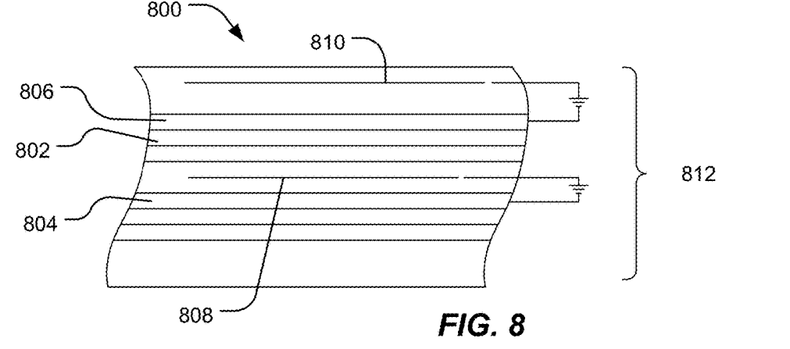
FIG. 8 and FIG. 9 include further illustrations of desalination systems including power circuitry.

In another example 800 of the power circuitry, FIG. 8 illustrates power circuitry in which charge on the electrodes 804 and 806 proximal to the semipermeable membrane 802 is applied relative to auxiliary electrodes 808 and 810 disposed in the respective solutions In such an example, the power circuitry 812 can provide greater difference in charge between the electrode 804 and the auxiliary electrode 808 positioned within the low concentration solution versus the potential difference between the electrode 806 and an auxiliary electrode 810 disposed in the high concentration solution.

Figure 9:
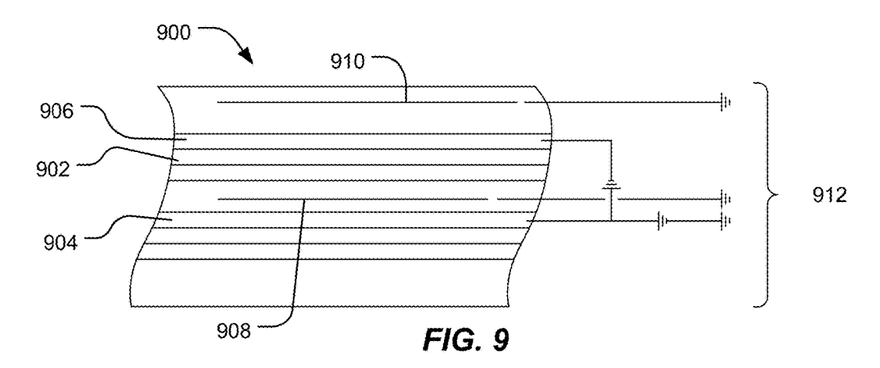

In a further example 900 illustrated in FIG. 9, a power circuitry 912 maintains the auxiliary electrodes 908 and 910 at ground and provides a bias charge relative to ground to the two electrodes 904 and 906 and further biases the electrodes 904 and 906 relative to each other to facilitate the difference in charge and accordingly, manipulate ion concentration proximal to surfaces of the semipermeable membrane 902.

While the circuitries are illustrated as direct-current circuitries, the charge applied to the electrodes and auxiliary electrodes can be facilitated using a direct current (DC) source, or an alternating current (AC) source biased with a DC source.

Figure 10:
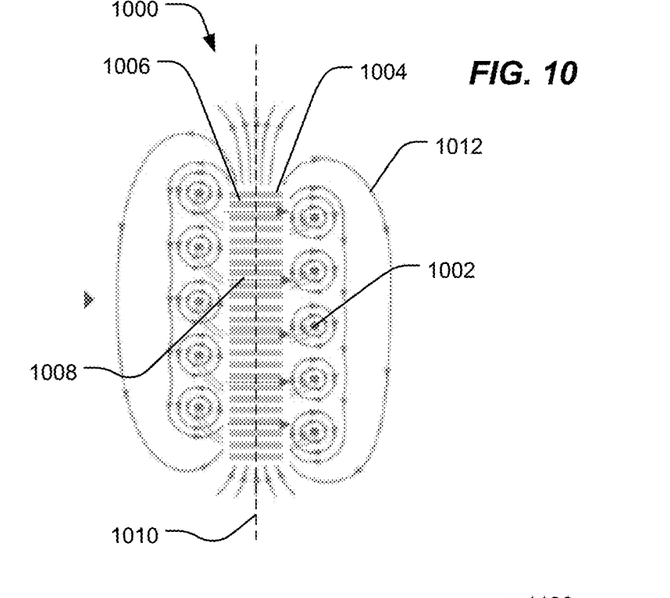
FIG. 10, FIG. 11, and FIG. 12 include illustrations of example water treatment apparatuses.

The system for treating water can further include devices to limit the growth of biological agents such as bacteria, fungus, mold, or other infectious agents from the water supply. In an example, a treatment apparatus 1000 is illustrated in FIG. 10. The treatment apparatus 1000 includes a solenoid arrangement 1002 having a central axis 1010. The apparatus also includes a high magnetic permeable media 1004 defining flow channels 1006 having a direction 1008 orthogonal to the axis 1010 of the solenoid 1002. In particular, the solenoid 1002 generates a magnetic field in which the flux lines 1012 extend parallel to the axis 1010 through the high magnetic permeable material 1004.

The high magnetic permeable material 1004 can have a permeability index of the range of 1 to 40,000. For example, the high permeable material 1004 can be formed of iron or other ferrous materials, nickel, permalloy and related alloys, mu-metal, zinc alloys, Lanthanoid-series doped ceramics, or a combination thereof.

In an example, the magnetic field is generated through the solenoids 1002 with an alternating current have a frequency not greater than 1000 Hz. For example, the frequency may be not greater than 500 Hz. Further, the frequency is at least 1 Hz, for example, being in the range of 40 Hz to 80 Hz, or a range of 50 Hz to 60 Hz.

The high permeability material 1004 defines a flow channels 1006 configured so that flow through the high magnetic permeable material has a flow direction 1008 that is orthogonal to an axis 1010 of the solenoid 1002. In another example, the high magnetic permeability material includes plates layered to form the flow channels 1006.

Figure 11:
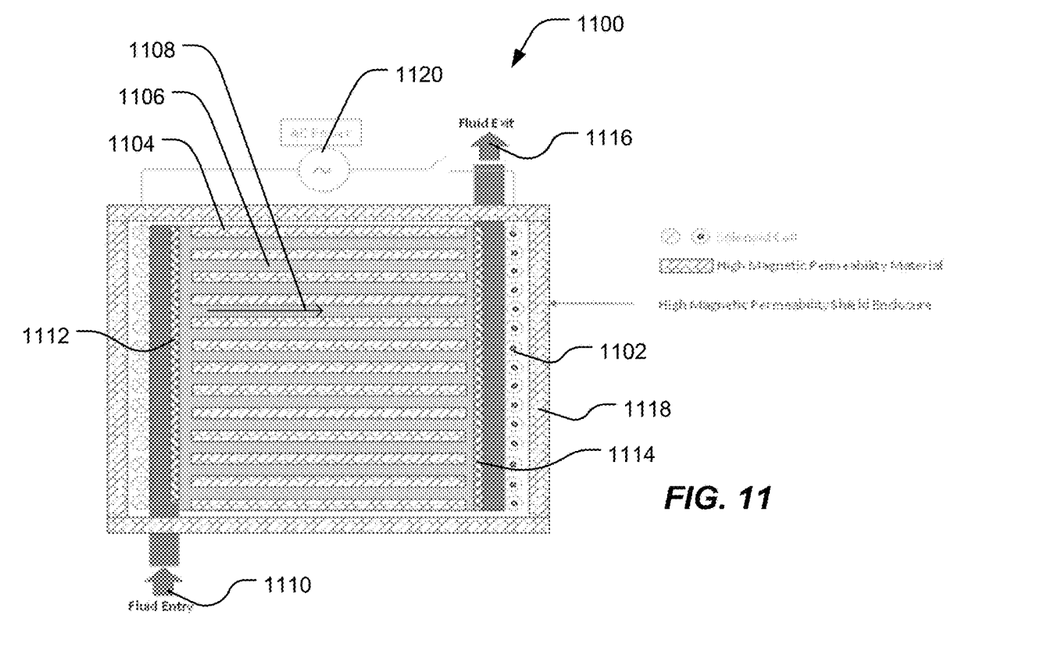

In a further example illustrated in FIG. 11, a system 1100 includes a solenoid 1102. A high magnetic permeability material 1104 is disposed within the solenoid 1102 and defines flow channels 1106 providing for fluid flow 1108 perpendicular to an axis of the solenoid 1102 and perpendicular to magnetic flux lines of a magnetic field generated by the solenoid 1102. Fluid can enter a fluid port 1110, flow through the channels 1106 of the high permeability material 1104, and flow out of the fluid effluent port 1116. To facilitate the even flow of water through the channels 1106 or to prevent contaminants from entering the flow channels 1106, one or more of the conduits providing fluid to the system can be perforated along the extent of the highly permeable material. For example, an influent conduit can be perforated at 1112 to provide a distributed flow through the channels 1106. Alternatively, flow can be controlled using perforations 1114 in a channel collecting fluid to be provided through the effluent port 1116.

Further, the device 1100 can include a high magnetic permeable casing 1118 surrounding the outside of the solenoid 1112 and the high permeability material 1104. The high magnetic permeable material 1104 or the high magnetic permeable casing 1118 can include iron or other ferrous materials, nickel, permalloy and related alloys, mu-metal, zinc alloys, Lanthanoid-series doped ceramics, or a combination thereof.

Accordingly, the arrangement of FIG. 11 allows for liquid flow through the system passing through the channels 1106 in a direction 1108 perpendicular to magnetic flux lines of the magnetic field generated by the solenoid 1102. The system 1100 can also include a power circuitry 1120 that provides an alternating current power to the solenoid to facilitate generation of the alternating magnetic field.

Figure 12:
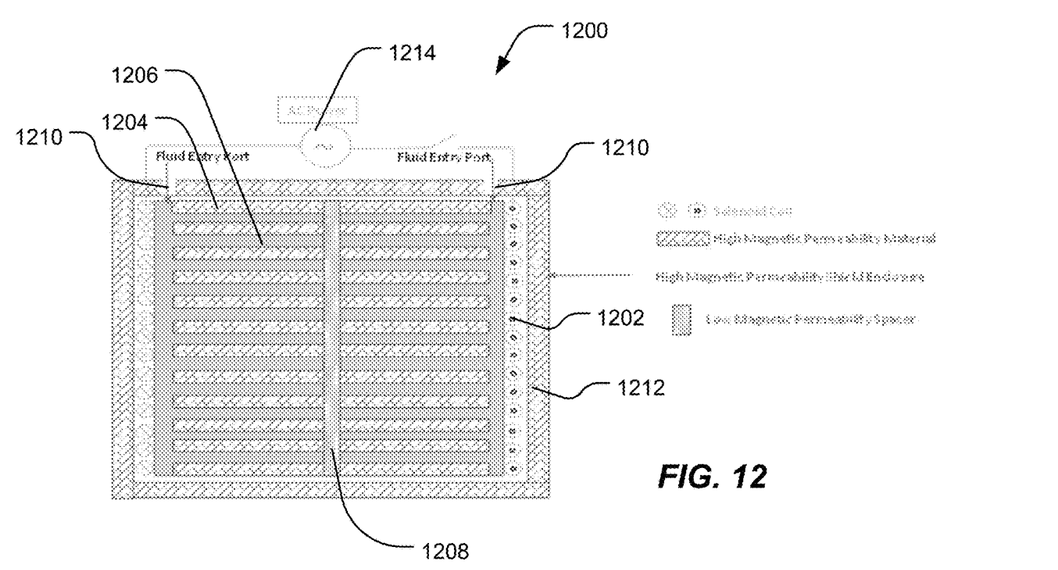

In another example, a static system 1200 can include a solenoid 1202 surrounding a high permeability material 1204. The high permeability material 1204 defines a set of channels 1206 having a longitudinal extent that is perpendicular to the center axis of the solenoid 1202. Fluid can be applied into fluid ports 1210 and may also alternatively exit the fluid ports 1210 following treatment. In addition, the system 1200 can include a high magnetic permeability casing 1212. A power circuitry 1214 can provide the desired alternating current to the solenoid 1202 to generate a magnetic field. Optionally, a low magnetic permeability spacer 1208 can be applied parallel to and proximal to the axis of the solenoid 1202. The spacer can be formed of low magnetic permeable material, such as alumina based ceramics, some polymers, bismuth, Austenitic stainless steel, or a combination thereof, among others.

Figure 13:
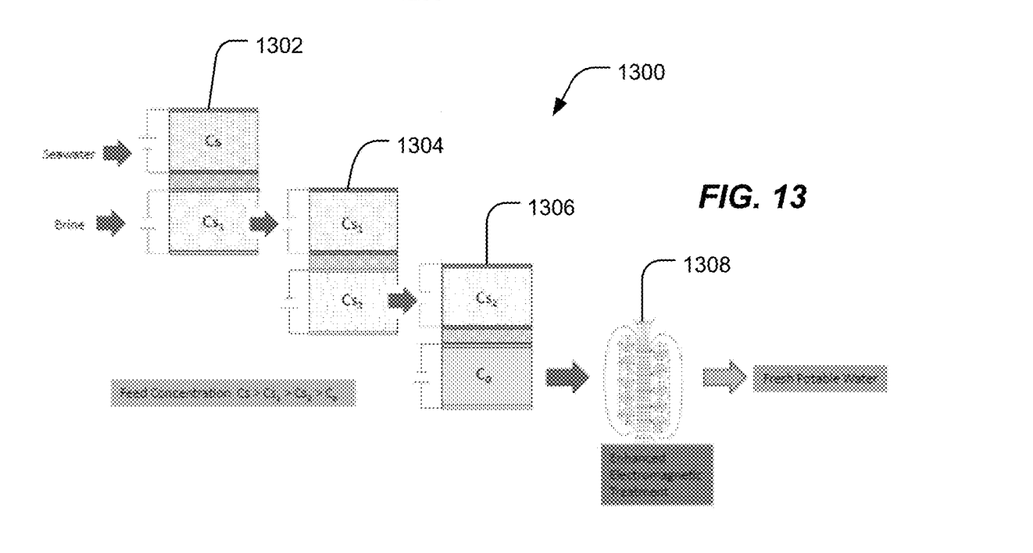
FIG. 13 includes an illustration of an example system for the treatment of water.

In a further example, the treatment systems and apparatuses can be combined to provide a system for generating water from contaminated saline sources. For example, as illustrated in FIG. 13, a system 1300 can include desalination units 1302, 1304, and 1306. For example, using the apparatus illustrated above with respect to FIGS. 2-9, seawater can be applied to the first side of the unit 1302. A brine solution can be applied to the second side of the unit 1302. Water can be driven from the seawater solution into the brine solution through the application of charge differences proximal to the semipermeable membrane. The brine solution is provided to the unit 1304 and a lower concentration solution is provided on the low concentration side of the desalination unit 1304. The brine can be recirculated for reuse in unit 1302 or can be discarded. The lower concentration solution can be provided from the unit 1304 to the high concentration side of the unit 1306, and a further desalination of the water can be performed in the unit 1306. Here too, the low concentration salt solution can be recirculated between the unit 1304 and 1306. Accordingly, the concentrations of the seawater is greater than the concentration of the brine, which is greater than the low concentration salt solution, which is greater than the potable water solution in terms of salt concentration.

Either before treatment of the salt water or following recovery of the water, the water can be treated using a treatment unit 1308 to address biological contamination. In particular, the unit 1308 can have the characteristics of units described in relation to FIGS. 10-12 above. As a result, a potable water can be derived from seawater using such a system. While the system 1300 is illustrated as having three desalination units 1302, 1304, and 1306, the system can include fewer or more desalination units and fewer or more solenoid units positioned either before or after the desalination units.

Figure 14:
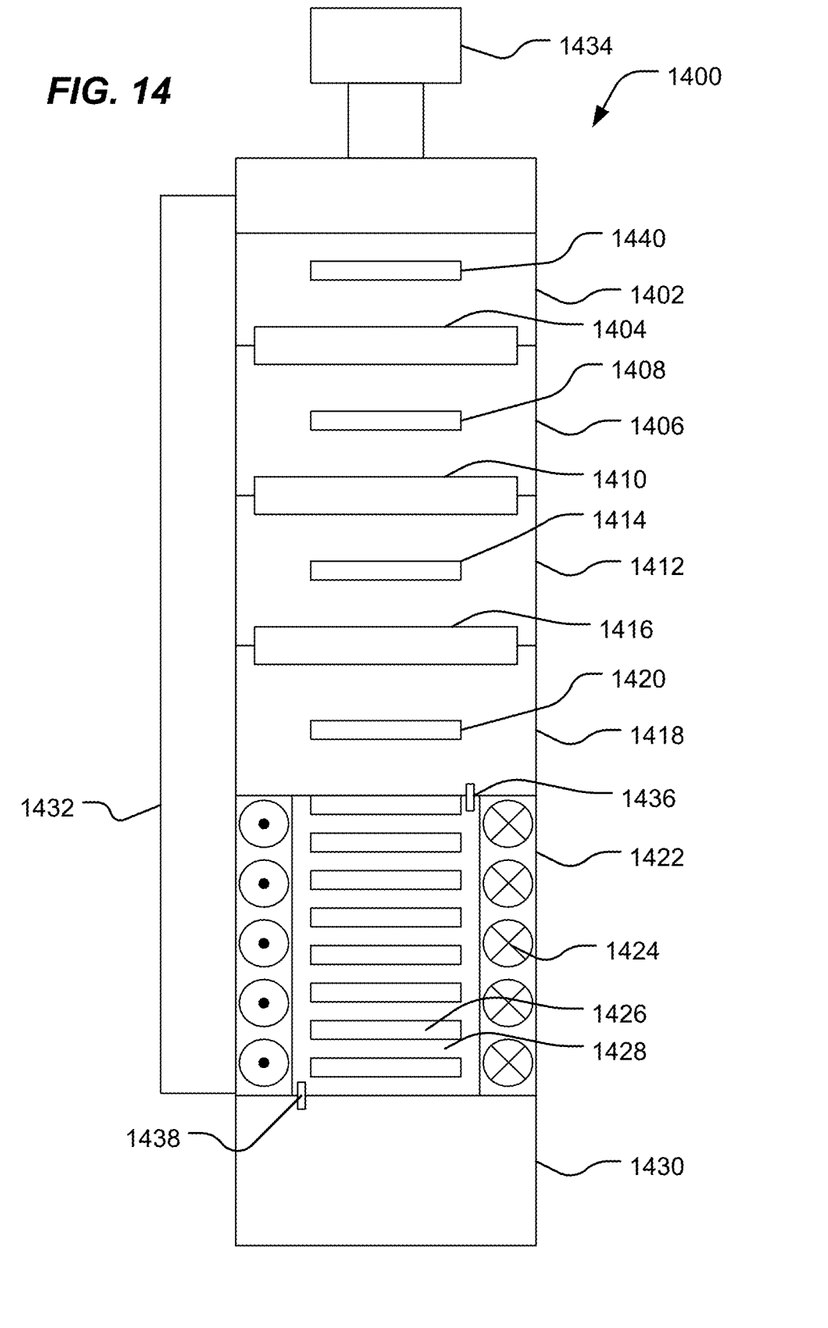
FIG. 14 includes an illustration of an example small form apparatus for the treatment of water.

Furthermore, the system can be implemented either in a small portable consumer apparatus or scaled to an industrial scale for providing water to the community. For example, FIG. 14 illustrates a small form apparatus 1400 that includes two or more chambers 1402, 1406, 1412, or 1418 separated by membrane assemblies 1404, 1410, or 1416. Each of the membrane assemblies 1404, 1410, or 1416 can include a semipermeable membrane and one or more electrodes positioned proximal to the surfaces of the semipermeable membranes. In addition, an auxiliary electrode 1440, 1408, 1414, or 1420 can be disposed in the chambers 1402, 1406, 1412, or 1418. The small form apparatus 1400 can optionally include a solenoid treatment unit 1422 that includes a solenoid 1424 surrounding a high magnetic permeability material 1426 that defines flow channels 1428 perpendicular to an axis of the solenoid 1424. Fluid can flow from the chamber 1418 to the solenoid treatment unit 1422 via port 1436 and exit via port 1438 to a storage chamber 1430. In addition, the small form apparatus 1400 can include circuitry to power and control the membrane assemblies 1404, 1410, or 1416 and solenoid 1424.

Further, the small form apparatus can include a plunger 1434 to apply pressure to the chamber 1402. While the small form apparatus 1400 is illustrated as including three membrane assemblies and one solenoid treatment unit, the apparatus 1400 can include fewer or more than three membrane assemblies and can include fewer or more solenoid treatment units.

In use, a saline solution can be applied to the chamber 1402 and the plunger 1434 can be fit into place. The circuitry 1432 can apply charge to the membrane assemblies 1404, 1410, or 1416 and the auxiliary electrodes 1440, 1408, 1414, and 1420, driving water from the saline solution across the membrane assemblies 1404, 1410, or 1416 and into the chamber 1418. The water can further flow through the solenoid treatment unit 1422 and to a storage chamber 1430.

EXAMPLE

Figure 15:
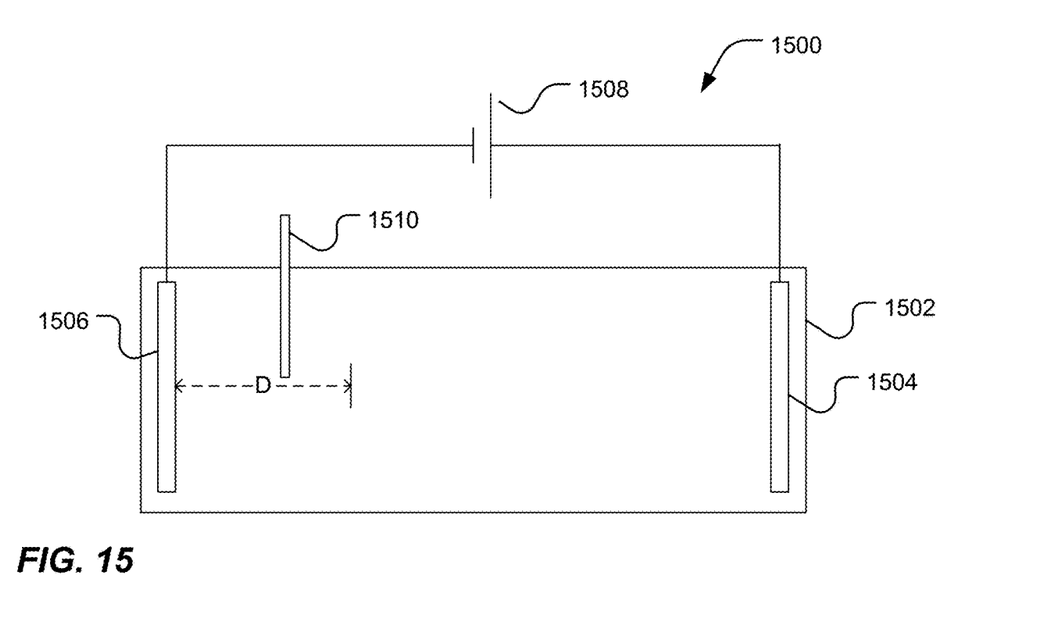
FIG. 15 includes an illustration of an example experimental apparatus.

Ion concentration is shown to change with distance depending on the potential applied to an electrode. As illustrated in FIG. 15, an apparatus 1500 includes a container 1502 in which two electrodes 1504 and 1506 are disposed at opposite sides of the container 1502. The electrodes 1504 and 1506 are formed of 50-micron stainless steel mesh. A potential is applied between the electrodes 1504 and 1506 using a power source 1508. A pH probe 1510 is used to measure pH at distances from an electrode 1506 within a range D, herein 8 cm.

Household vinegar (5% acetic acid) is used as an electrolyte and placed in the container 1502. The pH of the electrolyte is monitored as a function of distance from the cathode and applied potential to illustrate the change in H+ as a function of the applied electric field. The applied potential is varied to explore both the non-faradaic (no-electron transfer) regime and the faradaic regime where redox reactions resulted in $H_2$ evolution at the cathode and ethane ($C_2H_6$) and $CO_2$ co-evolution at the anode. The experiment illustrates a pH decrease in the non-faradaic regime at the cathode from electric field assisted $H^+$ diffusion and a pH increase in the faradaic regime from electrolysis induced $OH^-$ accumulation.

Figure 16:
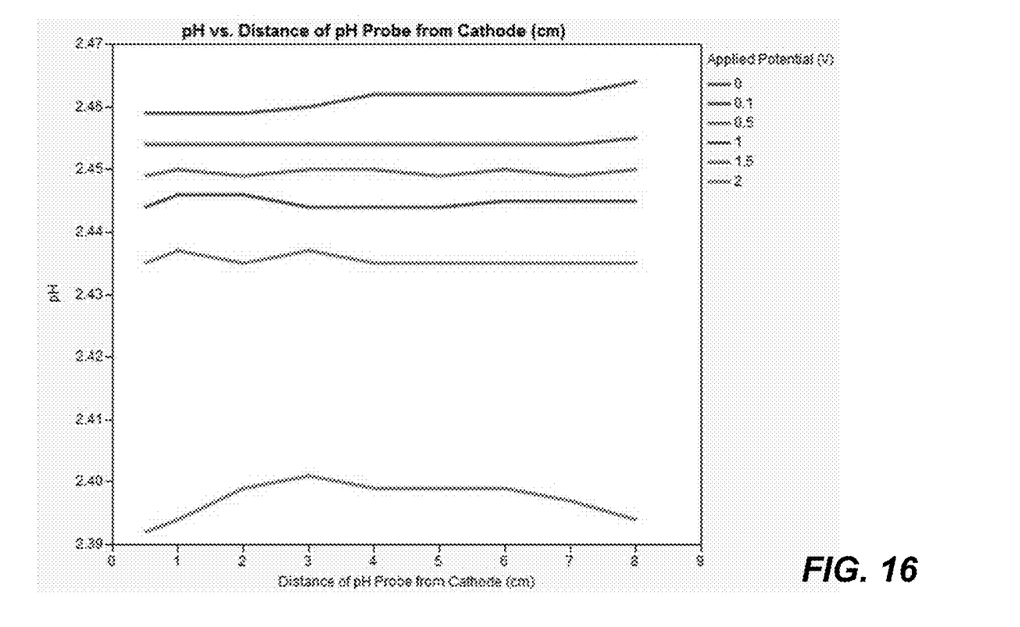
FIG. 16 includes a graph depicting the response of pH to applied potentials in the non-Faradaic regime.
Figure 17:
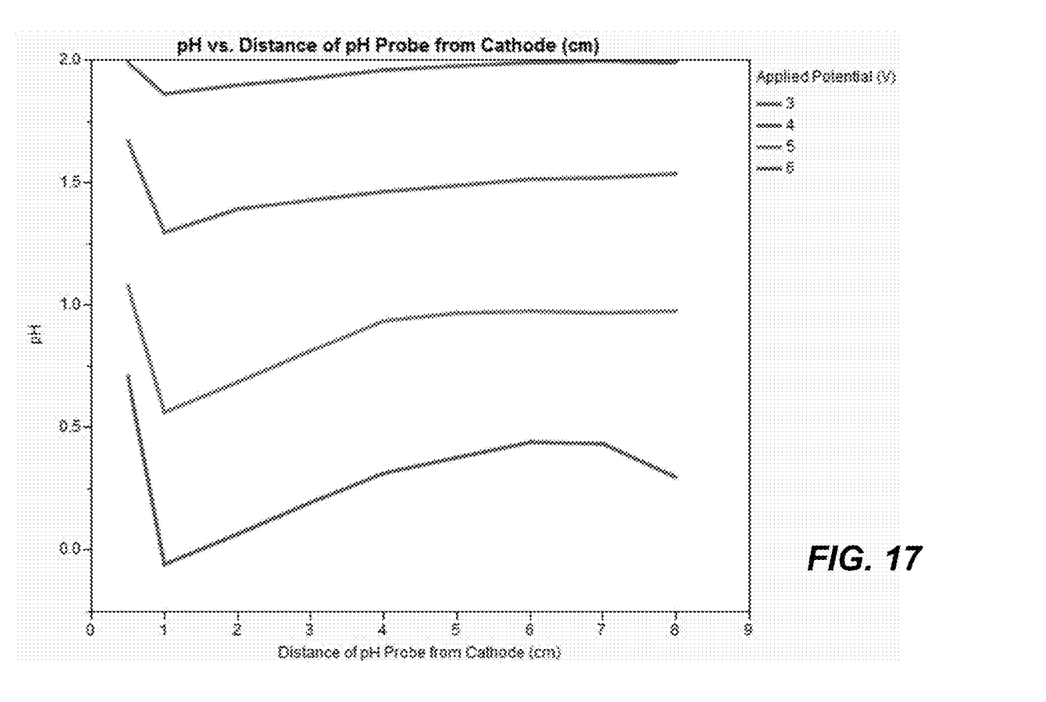
FIG. 17 includes a graph depicting the response of pH to applied potentials in the Faradaic regime.
Figure 18:
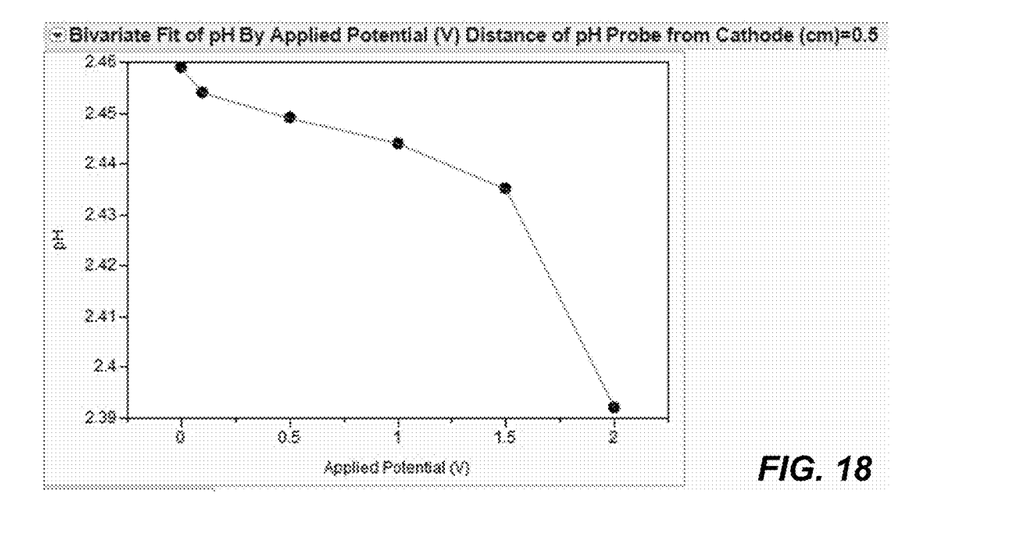
FIG. 18 includes a graph depicting the response of pH to applied potentials in the non-Faradaic regime FIG. 19 includes a graph depicting the response of H+ concentration to applied potentials in the non-Faradaic regime.
Figure 19:
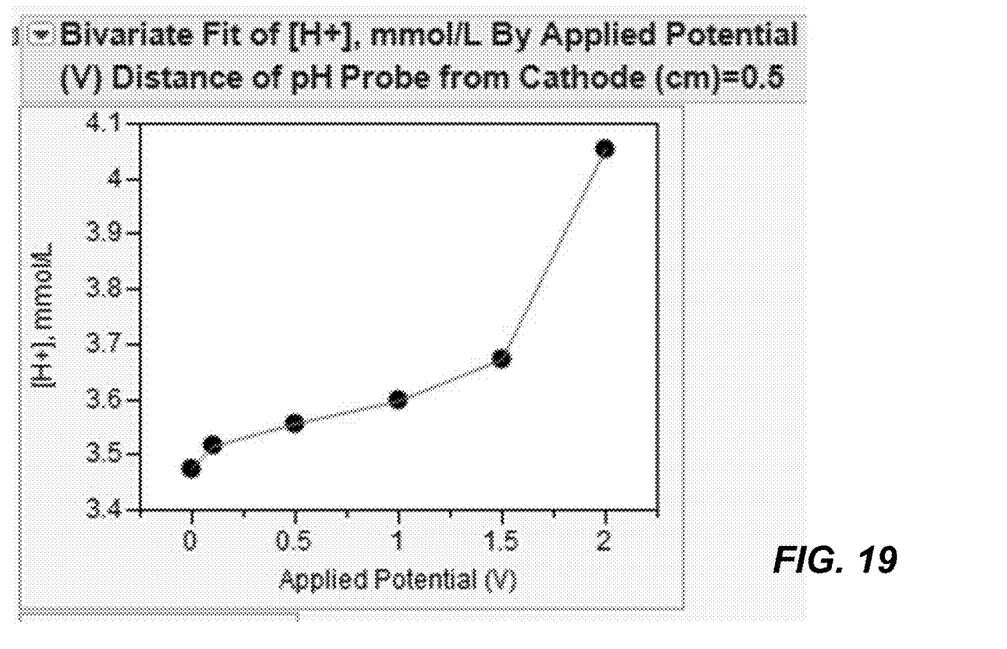

As illustrated in FIG. 16, at near zero applied potential the pH exhibits some pH depression near the electrode as a result of a reaction between iron in the stainless steel electrode and water. When small applied potentials (0.1 V, 0.5 V, 1 V, 1.5 V and 2.0 V) within the non-Faradaic regime are applied, the pH near the electrode and extending out a few centimeters is lower. When a higher potential (≥3 V) within the Faradaic regime is applied (FIG. 17), the pH adjacent the electrode rises in response to evolution of $H_2$ at the electrode, which lowers the H concentration and raises the relative level of hydroxyl ion concentration near the electrode and consequently the local pH. Nevertheless, the pH decreases within the solution near the electrode with increasing potential. FIG. 18 illustrates the response of pH and FIG. 19 illustrates the response of concentration of $H^+$ at 0.5 cm from the electrode with increasing applied potential within the non-Faradaic regime. With increasing applied potential within the non-Faradaic regime, the pH decreases and the concentration of $H^+$ increases. As such, applied potentials can be used to alter the concentration of ionic species in proximity to electrodes placed proximal to a membrane.

In a first aspect, a desalination apparatus includes a first fluid container to receive a first aqueous solution having a first concentration of a salt; a second fluid container to receive a second aqueous solution having a second concentration of the salt, the first concentration being greater than the second concentration; and a membrane assembly disposed between the first fluid container and the second fluid container and in fluid contact with the first aqueous solution and the second aqueous solution. The membrane assembly includes a semipermeable membrane having a first side to be in fluid contact with the first aqueous solution and having a second side to be in fluid contact with the second aqueous solution; a first electrode assembly disposed adjacent the first side of the semipermeable membrane and to contact the first aqueous solution; a second electrode assembly disposed adjacent the second side of the semipermeable membrane and to contact the second aqueous solution; and power circuitry to apply charge to the first and second electrode assemblies to provide an ion concentration at the second side of the semipermeable membrane that is at least equal to an ion concentration on the first side of the semipermeable membrane.

In an example of the first aspect, the first and second fluid containers include flow channels.

In another example of the first aspect and the above examples, the first and second fluid containers are in a tube-in-tube configuration.

In a further example of the first aspect and the above examples, the semipermeable membrane is a water permeable membrane. For example, the water permeable membrane includes polyamide.

In an additional example of the first aspect and the above examples, the first electrode assembly is an inert electrode.

In another example of the first aspect and the above examples, the first electrode assembly includes a conductive electrode material.

In a further example of the first aspect and the above examples, the first electrode assembly is a slotted electrode.

In an additional example of the first aspect and the above examples, the second electrode assembly is an inert electrode.

In another example of the first aspect and the above examples, the second electrode assembly includes a conductive electrode material.

In a further example of the first aspect and the above examples, the second electrode assembly is a fissured electrode.

In an additional example of the first aspect and the above examples, the ion concentration is a cation concentration.

In another example of the first aspect and the above examples, the first and second electrodes have the same polarity relative to ground.

In a further example of the first aspect and the above examples, a potential difference between the second and first electrode assemblies is 10 mV to 1.23V.

In an additional example of the first aspect and the above examples, a pressure of the first aqueous solution in the first fluid container is at least the pressure of the second aqueous solution in the second fluid container.

In another example of the first aspect and the above examples, the desalination apparatus further includes a first auxiliary electrode in fluid contact with the first aqueous solution. For example, the first auxiliary electrode is grounded. In another example, the first auxiliary electrode has a polarity opposite a polarity of the first electrode assembly. In an additional example, the desalination apparatus further includes a second auxiliary electrode in fluid contact with the second aqueous solution. For example, the second auxiliary electrode is grounded. In another example, the second auxiliary electrode has a polarity opposite a polarity of the second electrode assembly.

In a further example of the first aspect and the above examples, the power circuitry includes a DC power source.

In an additional example of the first aspect and the above examples, the power circuitry includes a DC power source and an oscillating power source.

In another example of the first aspect and the above examples, the power circuitry controls charge on the first electrode assembly and the second electrode assembly independently.

In a second aspect, a desalination apparatus includes a first fluid container to receive a first aqueous solution having a first concentration of a salt; a second fluid container to receive a second aqueous solution having a second concentration of the salt, the first concentration being greater than the second concentration; and a membrane assembly disposed between the first fluid container and the second fluid container and in fluid contact with the first aqueous solution and the second aqueous solution. The membrane assembly includes a semipermeable membrane having a first side to be in fluid contact with the first aqueous solution and having a second side to be in fluid contact with the second aqueous solution; an electrode assembly disposed adjacent the second side of the semipermeable membrane and to contact the second aqueous solution; and power circuitry to apply charge to the electrode assembly to provide an ion concentration at the second side of the semipermeable membrane that is at least equal to an ion concentration on the first side of the semipermeable membrane.

In an example of the second aspect, the first and second fluid containers include flow channels.

In another example of the second aspect and the above examples, the first and second fluid containers are in a tube-in-tube configuration.

In a further example of the second aspect and the above examples, the semipermeable membrane is a water permeable membrane. In an example, the water permeable membrane includes polyamide.

In an additional example of the second aspect and the above examples, the electrode assembly is an inert electrode.

In another example of the second aspect and the above examples, the electrode assembly includes a conductive electrode material.

In a further example of the second aspect and the above examples, the electrode assembly is a fissured electrode.

In an additional example of the second aspect and the above examples, the ion concentration is a cation concentration.

In another example of the second aspect and the above examples, a pressure of the first aqueous solution in the first fluid container is at least the pressure of the second aqueous solution in the second fluid container.

In a further example of the second aspect and the above examples, the desalination apparatus further includes an auxiliary electrode in fluid contact with the second aqueous solution. For example, the auxiliary electrode is grounded.

In an additional example of the second aspect and the above examples, the power circuitry includes a DC power source.

In another example of the second aspect and the above examples, the power circuitry includes a DC power source and an oscillating power source.

In a third aspect, a system includes a first desalination unit including the desalination apparatus second aspect; and a second desalination unit including the desalination apparatus of the second aspect.

In an example of the third aspect, the system further includes a third desalination unit including the desalination apparatus of the second aspect.

In another example of the third aspect and the above examples, the system further includes a treatment apparatus including a solenoid.

In a fourth aspect, a method for desalinating water with a desalination apparatus comprising a membrane assembly and a power circuitry, the membrane assembly including a semipermeable membrane having first and second sides and including an electrode assembly disposed adjacent the second side of the semipermeable membrane, includes applying a first aqueous solution having a first bulk concentration of salt to the first side of the semipermeable membrane; applying a second aqueous solution having a second bulk concentration of salt to a second side of the semipermeable membrane, the first bulk concentration greater than the second bulk concentration; and charging the electrode assembly to provide a local ion concentration proximal to the second side of the semipermeable membrane greater than a local ion concentration proximal to the first side of the semipermeable membrane.

In an example of the fourth aspect, a difference in the local ion concentrations proximal to the first and second sides of the semipermeable membrane is sufficient to facilitate flow of water from the first side of the semipermeable membrane to the second side of the semipermeable membrane.

In another example of the fourth aspect and the above examples, the desalination apparatus further includes a second electrode assembly disposed adjacent the first side of the semipermeable membrane, wherein charging the electrode assembly further includes charging the second electrode assembly. For example, applying the charge includes applying a charge of the same polarity to the electrode assembly and the second electrode assembly, wherein the charge applied to the electrode assembly has a greater magnitude that the charge applied to the second electrode assembly. In another example, a difference between the charge on the electrode assembly and the charge on the second electrode assembly is in a range of 10 mV to 1.23V.

In a further example of the fourth aspect and the above examples, applying the first aqueous solution includes flowing the first aqueous solution through a flow channel in fluid communication with the first side of the membrane assembly.

In an additional example of the fourth aspect and the above examples, applying the first aqueous solution and applying the second aqueous solution includes applying pressure to the first aqueous solution.

In a further example of the fourth aspect and the above examples, the desalination apparatus further includes an auxiliary electrode in fluid contact with the second aqueous solution, wherein applying a charge to the electrode assembly includes applying an opposite charge to the auxiliary electrode.

In another example of the fourth aspect and the above examples, the desalination apparatus further includes an auxiliary electrode in fluid contact with the second aqueous solution, wherein the auxiliary electrode is grounded when applying a charge to the electrode assembly.

In a further example of the fourth aspect and the above examples, the method further includes adjusting a distance between the semipermeable membrane and the electrode assembly.

In a fifth aspect, a fluid treatment apparatus includes a solenoid having windings disposed along a longitudinal axis; a high permeability material defining fluid channels defining a flow path orthogonal to the longitudinal axis; and a power circuitry electrically connected to the solenoid to generate a magnetic field having flux lines parallel to the longitudinal axis and orthogonal to the flow path.

In an example of the fifth aspect, the fluid treatment apparatus further includes a casing formed of a high permeability material to contain the electromagnetic field within the casing.

In another example of the fifth aspect and the above examples, the fluid treatment apparatus further includes an outer casing, the solenoid and the high permeability material disposed in the outer casing.

In a further example of the fifth aspect and the above examples, the outer casing is formed from a high permeability material.

In an additional example of the fifth aspect and the above examples, the fluid treatment apparatus further includes a liquid permeable plate disposed at a side of the high permeability material and extending parallel to the longitudinal axis.

In another example of the fifth aspect and the above examples, the power circuitry provides an alternating current supply to the solenoid.

In a further example of the fifth aspect and the above examples, a frequency of the alternating current is not greater than 1000 Hz. For example, the frequency is not greater than 500 Hz. In an example, the frequency is at least 1 Hz. For example, the frequency is in a range of 40 Hz to 80 Hz.

In an additional example of the fifth aspect and the above examples, the high permeability material includes plates layered to form the flow channels.

In a sixth aspect, a method for treating a fluid includes generating an alternating magnetic field with a solenoid and power supply connected to the solenoid, the magnetic field having flux lines parallel to a longitudinal axis of the solenoid; and flowing a fluid through fluid channels defined by a high permeability material, the fluid channels defining a flow path orthogonal to the longitudinal axis.

In an example of the sixth aspect, a frequency of the alternating magnetic field is not greater than 1000 Hz. For example, the frequency is not greater than 500 Hz. In an example, the frequency is at least 1 Hz. In a particular example, the frequency is in a range of 40 Hz to 80 Hz.

In a seventh aspect, a system includes a plurality of desalination cells, each comprising the desalination apparatus of the second aspect; and a fluid treatment apparatus comprising the fluid treatment apparatus of claim fifth aspect.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A desalination apparatus comprising:
   a first fluid container to receive a first aqueous solution having a first concentration of a salt;
   a second fluid container to receive a second aqueous solution having a second concentration of the salt, the first concentration being greater than the second concentration;
   a membrane assembly disposed between the first fluid container and the second fluid container and in fluid contact with the first aqueous solution and the second aqueous solution, the membrane assembly comprising:
   a semipermeable membrane having a first side to be in fluid contact with the first aqueous solution and having a second side to be in fluid contact with the second aqueous solution;
   a first electrode assembly disposed adjacent the first side of the semipermeable membrane and to contact the first aqueous solution;
   a second electrode assembly disposed adjacent the second side of the semipermeable membrane and to contact the second aqueous solution; and
   power circuitry to apply charge to the first and second electrode assemblies to provide an ion concentration at the second side of the semipermeable membrane that is at least equal to an ion concentration on the first side of the semipermeable membrane, wherein the first and second electrode assemblies have the same polarity relative to ground.

2. The desalination apparatus of claim 1, wherein the first and second fluid containers include flow channels.

3. The desalination apparatus of claim 1, wherein the first and second fluid containers are in a tube-in-tube configuration.

4. The desalination apparatus of claim 1, wherein the semipermeable membrane is a water permeable membrane.

5. The desalination apparatus of claim 4, wherein the water permeable membrane includes polyamide.

6. The desalination apparatus of claim 1, wherein the first electrode assembly is an inert electrode.

7. The desalination apparatus of claim 1, wherein the first electrode assembly includes a conductive electrode material.

8. The desalination apparatus of claim 1, wherein the first electrode assembly is a slotted electrode.

9. The desalination apparatus of claim 1, wherein the second electrode assembly is an inert electrode.

10. The desalination apparatus of claim 1, wherein the second electrode assembly includes a conductive electrode material.

11. The desalination apparatus of claim 1, wherein the second electrode assembly is a fissured electrode.

12. The desalination apparatus of claim 1, wherein the ion concentration is a cation concentration.

13. The desalination apparatus of claim 1, wherein a potential difference between the second and first electrode assemblies is 10 mV to 1.23V.

14. The desalination apparatus of claim 1, wherein a pressure of the first aqueous solution in the first fluid container is at least the pressure of the second aqueous solution in the second fluid container.

15. The desalination apparatus of claim 1, further comprising a first auxiliary electrode in fluid contact with the first aqueous solution.

16. The desalination apparatus of claim 15, wherein the first auxiliary electrode is grounded.

17. The desalination apparatus of claim 15, wherein the first auxiliary electrode has a polarity opposite a polarity of the first electrode assembly.

18. The desalination apparatus of claim 15, further comprising a second auxiliary electrode in fluid contact with the second aqueous solution.

19. The desalination apparatus of claim 18, wherein the second auxiliary electrode is grounded.

* * * * *